UNITED STATES PATENT OFFICE.

EDGAR NELSON, OF LIMA, OHIO.

PROCESS OF TREATING ANIMAL TENDONS.

SPECIFICATION forming part of Letters Patent No. 709,352, dated September 16, 1902.

Application filed October 24, 1901. Serial No. 79,816. (No specimens.)

*To all whom it may concern:*

Be it known that I, EDGAR NELSON, a citizen of the United States, and a resident of Lima, in the county of Allen and State of Ohio, have invented a certain new and useful Process of Treating Animal Tendons, of which the following is a full, clear, and exact description.

My invention relates to a process and its product, the process being for the preparation of animal tendons for use as packings and the product being the animal tendons thus treated for such use.

I select suitable animal tendons and subject them to the action of preservatives—such as permanganate of potassium, oil, soap, niter, alum, common salt, or tannin—until the entire substance of the tendons is sufficiently permeated to prevent putrefaction. I next apply a lubricant, preferably of a powdered mineral substance, such as talc, plumbago, or mica, or some mixture thereof. While the prepared tendons are permeated to some extent by these powdered mineral lubricants, the extent to which the lubricants permeate is comparatively slight and the application of the lubricants is therefore superficial. The tendons are next formed into any suitable shape desired for packings. These packings may be used for pumps, engines, and nearly all other machines where packings are required. I find that packings thus prepared are of the very highest grade and that they have lasting qualities. They give comparatively little trouble and are quite satisfactory wherever used. The packings may of course be made of any size and may be kept on the market indefinitely without deteriorating. I find that these packings when coated with talc develop a certain color peculiarly desirable in a packing and that its lasting qualities are improved independently of the action of the talc as a lubricant. Any other coloring-matter, however, may be used as desired, being simply applied to the exterior of the packing.

Having thus described my invention, I claim as new and desire to secure by Letters Patent—

1. The process, herein described, of preparing packings; which consists in subjecting animal tendons to the action of preservatives and then impregnating the tendons thus treated with lubricants.

2. The process, herein described, of preparing packings; which consists in subjecting animal tendons to the long-continued action of a preservative, thus impregnating the entire substance of said tendons with said preservative, and then impregnating said tendons superficially with a lubricant for the purpose of rendering the exterior surfaces thereof smooth.

3. The process, herein described, of preparing packings; which consists in subjecting animal tendons to the action of preservatives for the purpose of rendering said tendons durable, and superficially impregnating the tendons thus treated with powdered talc for the purpose of rendering said tendons smooth and of giving them a suitable color.

4. The product herein described, consisting of packings made of preserved animal tendons impregnated superficially with lubricants.

5. The product herein described, consisting of packings made of preserved animal tendons impregnated superficially with a powdered mineral lubricant.

6. The product herein described, consisting of packings made of preserved animal tendons impregnated superficially with powdered talc for the purpose of rendering the same smooth and changing the color thereof.

In testimony whereof I have signed my name to this specification in the presence of two subscribing witnesses.

EDGAR NELSON.

Witnesses:
FAY. HULL,
O. WARREN SMITH.